Aug. 27, 1957 B. F. SHAUGHNESSY 2,804,210
APPARATUS FOR SEPARATING SOLIDS FROM LIQUIDS
Filed Aug. 10, 1956 2 Sheets-Sheet 2
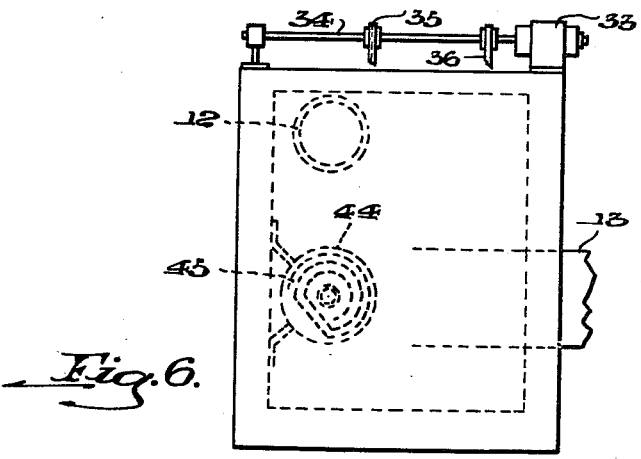
Fig. 6.
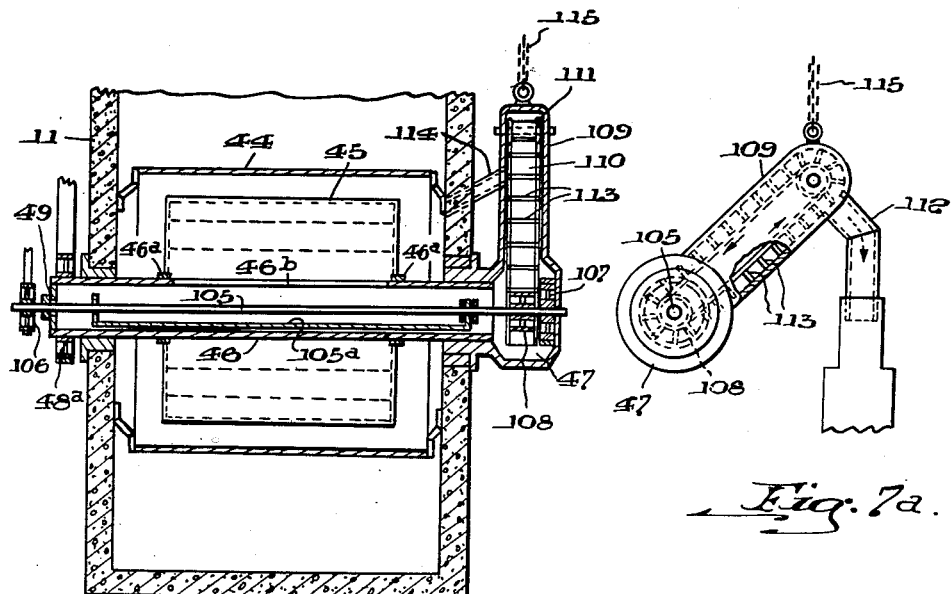
Fig. 7.
Fig. 7a.
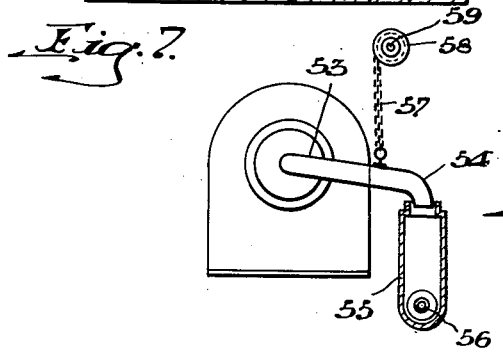
Fig. 8.
INVENTOR.
BERNARD F. SHAUGHNESSY
BY Archworth Martin
his ATTORNEY

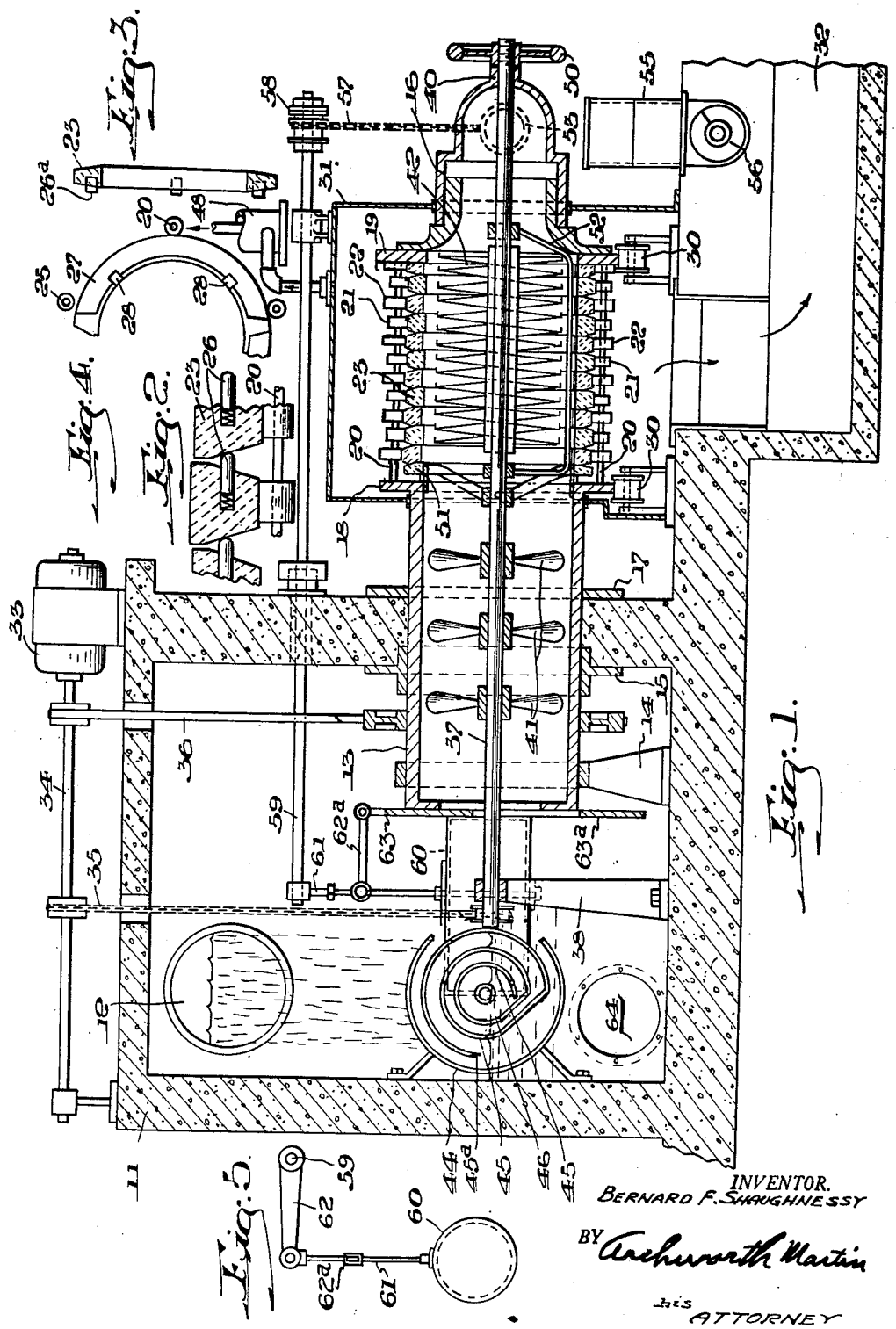

2,804,210

APPARATUS FOR SEPARATING SOLIDS FROM LIQUIDS

Bernard F. Shaughnessy, Catasauqua, Pa.

Application August 10, 1956, Serial No. 603,273

6 Claims. (Cl. 210—394)

My invention relates to an improved manner of water purification, and particularly in the removal of solids therefrom, as in the case of domestic sewage and the like. This case is a continuation in part, of my application Ser. No. 482,496, filed January 18, 1955, now Patent No. 2,763,375.

The invention has for its object the provision of an improved means for separating solids from liquids in a more effective manner than various screening and sedimentation devices heretofore employed.

One of the forms which my invention may take are shown in the accompanying drawings, wherein Figure 1 is a longitudinal sectional view through a sewage collecting sump and screening apparatus for receiving the sewage as it leaves the sump, to effect further separation of the water and solids:

Fig. 2 is an enlarged sectional view through some of the screening rings of Fig. 1;

Fig. 3 is a sectional view of another form of rings and spacer elements therefor;

Fig. 4 is a fragmentary face view showing a modification wherein another form of spacer element is employed between the rings;

Fig. 5 is a view showing the manner in which a float is employed in the sump chamber to operate a discharge orifice or valve at the outlet end of the chamber, to thereby control the liquid level in the sump and in the screening chamber;

Fig. 6 is a reduced side view of a portion of the sump of Fig. 1;

Fig. 7 is a cross sectional view at the rear end of the sump, partly in section; Fig. 7a is a fragmentary end elevation thereof; and Fig. 8 is a view at the discharge end of the system of Fig. 1, showing the manner in which the float of Fig. 5 controls discharge of partially de-watered sludge from the screening drum.

The system comprises a sump 11 into which sewage or other solid-containing liquid is introduced through a sewer 12. A screening drum 13 is rotatably supported in bearings at 14, 15 and 16, there being a close fit at 15 and by a washer 17 to prevent leakage from the sump.

The drum flange 18 that is connected to an annular ring or flange 19 by tie rods 20, the rods 20 serving to support rollers 21 and 22 that are of slightly eccentric contour relative to the rods 20, to provide for radial shifting of screening rings 23 that rest upon and between the rollers, during rotation of the drum. As shown in Fig. 2, the rings have thickened bases whose sides are radially parallel for substantial distances.

Radial shifting of the rings relative to one another can be had also simply by providing for some clearance between the rings and the rollers, as indicated at the roller 25 in Fig. 4, since during each revolution of the drum, the rings will move against the rollers successively as they come to the lower part of their path of travel, under the action of gravity.

Also, the rings can have relative idling rotative movement during rotation of the drum. These relative radial and rotative movements in radial planes have the effect of preventing clogging of the spaces between the rings, which spaces may be as little as .002 inch.

The rings may be separated by spring-pressed plungers 26 as in Fig. 2; or by yieldable buttons 26a of Fig. 3, or by interspersed flat rings 27 that have protrusions 28 which may suitably be of spring metal, so that the rings can be adjusted toward and from one another as hereinafter explained, to vary the spacing or screen openings between the rings.

The drum flanges 18—19 are rotatably supported by four idle rollers 30, only two of which are here shown. A casing or hood 31 partially encloses the drum and is open at its lower side for discharge of water to a conduit 32.

A motor 33, through a shaft 34 and chain drive 35 and belt 36, rotates the drum 13 and a shaft 37 respectively, suitable reduction gearing being provided so that the shaft is not rotated too rapidly to permit of adequate separation of water from the solids during movement of the sewage through the drum 13. The shaft 37 is supported in bearings at 38 and 40 and carries impellers 41 of the paddle type and a screw conveyor 42, the conveyor 42 serving to advance the body of the liquid through the drum with considerable force while the impellers 41 are angled in a direction to effect some backward flow of floating solids near the surface of the stream of sewage which is maintained at about the level of the shaft 37.

As the sewage is advanced through the drum, under the propelling force of the conveyor 42, the paddles 41 exert a backward thrust on the solids to simply retard them or to push them into a shield or hood 44 within which is contained a scoop 45 of spiral form that is closed at its ends and will scoop up the flotsam or solids. The scoop is rotated (Fig. 7) in a suitable manner by a tubular shaft 46 to which it is rigidly connected by a pair of rings 46a, by welding or otherwise. The shaft 46 has an opening 46b through which the sewage from the scoop 45 will enter, for discharge into the chamber of a housing 47 at the outer end of the shaft. The solids intermixed with a considerable quantity of water are drawn into the center of the scoop and conducted into the chamber 47, from which the solids are conveyed to a drying station and perhaps later incinerated, as hereinafter explained.

While the paddles 41 may not at all times actually create a back flow of the floating solids, they will exert a retardent or damming effect that will cause them to accumulate at the open side of the shield 44, into which they will be drawn by reason of discharge through the tubular shaft 46. If there is only a small amount of solids, the scoop 45 will be stopped with its edge 45a above the water level, or rotated only intermittently.

The shaft 46 is driven by a pulley 48a and is closed at its inner end by a plate 49 that serves as a bearing for a shaft 105 that is driven by a pulley 106, from a suitable power source. At its outer end, the shaft is supported in a bearing 107 that is secured to the inner wall of the housing 47. A scraper bar 105a hangs loosely from the shaft 105 and prevents accumulation of a sludge film on the inner wall of 46. The edge of the bar is at an angle to the axis of the shaft, so as to urge sludge along the inner wall of the shaft 46 to its discharge end.

A conveyor sprocket 108 is driven by the shaft 105. An elongated casing 109 slopes upwardly from the housing 47 and serves as an enclosure for a conveyor 110 that extends around a sprocket 111 which is journaled in the upper end of the casing 109 which has a spout 112 for discharge into a drier or incinerator.

The conveyor 110 is of belt-like form having scraper blades 113 which move upwardly along the lower inner wall of the casing 109 as indicated in Fig. 7a. The casing serves as a conveyor trough, so that solids are moved upwardly by the conveyor blades 113 and then discharged at 112.

At a height slightly above the normal water level in the sump 11, a discharge pipe 114 conducts water and remnants of solids from the casing 109 into the sump 11, for movement into the drum 13.

As hereinafter explained, the water level in the sump is primarily controlled at the discharge end of the drum 13, but I provide a hanger chain for adjusting the outer end of the casing 109, to control water flow through the chamber 47 and the casing 109, the pipe 114 being of flexible material, to permit of such adjustments.

As the main body of liquid is advanced through the drum, it passes the screening rings 23 and water is drained through the rings by gravity and also drawn by suction within the upper portion of the casing 31 by a vacuum pump 48. A considerable quantity of water will be drawn from between the rings 23 by this suctional force, above the level of the shaft 37, particularly because of the close spacing of the rings, a considerable quantity of water is carried between them during rotation into the upper half of their path. This water will flow to the conduit 32. The suctional force also reduces tendency toward clogging of the spaces between the screening rings.

The spacing between the rings is controlled by a hand wheel 50 that has threaded engagement with the shaft 37, so that the wheel can be turned to shift the shaft axially somewhat, carrying with it a presser ring or collar 51 that is keyed thereto, thereby compressing the yieldable bosses 26 or 28. When the hand wheel 50 is turned in the reverse direction, the bosses will expand to increase the spacing between the rings. A scraper bar 52 of yoke-like form is idlingly suspended on the shaft 37 to have scraping engagement with the inner peripheral surfaces of the rings and to agitate solids that tend to settle in the drum.

After withdrawal of the major portion of the water from the sewage, the thickened sludge-like residue which, however, is of considerable fluidity will be discharged through an outlet 53 into a spout 54 and thence to a hopper 55 from which a screw conveyor 56 will convey it to a drying bed or incinerator. The spout 54 is automatically raised and lowered by a chain 57 to control the liquid level in the drum. This chain is wound on a reel 58 carried by a rock shaft 59 which is oscillated by a float 60 whose stem 61 is pivotally connected to a crank arm 62 on the shaft 59. When the water level in the sump and the drum rises above a desired level, the shaft 59 will be rocked in a direction to lower the spout 54. Contrarywise, when the water level falls, the float will rock the shaft 59 in a direction to raise the outer end of the spout 54 slightly. The float stem 61 has an extension 62a with a rod 63 for raising and lowering a valve plate 63a with rise and fall of the float, to thereby control the liquid level. A clean-out opening 64 is provided for removing sludge from the sump.

I claim as my invention:

1. A screening device comprising a casing having an inlet opening at one end and a discharge opening adjacent to its other end, a drum-like screen therein rotatable on a horizontal axis, an impeller in the casing for advancing liquid therethrough, along the screening area and moving the unscreened material to the discharge opening, a paddle-like impeller disposed between the inlet and the other impeller and operating in the reverse direction to retard floating solids and effect accumulation of substantial quantities thereof at the inlet to the casing, and a scoop operated in a direction to remove solids that are thus accumulated.

2. A screening device that comprises a sump, a casing having inlet and discharge openings, a passageway connecting the sump and the said inlet opening, a screening device in the casing, a conveyor in the casing that moves a mixture of liquids and solids past the screen and discharges the solids at the said outlet opening, a reversely-acting impeller adjacent to the inlet opening and of less propulsive force than the said conveyor and which is driven in a direction to retard flow of floating solids through the casing, with sufficient force to effect accumulation of floating solids in the sump, and a scoop operated in a direction to remove the accumulated solids from the sump.

3. Apparatus as in claim 2, wherein the scoop is of loose spiral form, with its periphery extending to a plane below the liquid level, and having a lateral discharge adjacent to its axis.

4. Apparatus as in claim 2, wherein the scoop is of loose spiral form, with its periphery extending to a plane, below the liquid level, and having a lateral discharge adjacent to its axis, and wherein means are provided for effecting separation of solids from the mixture thus scooped and for diverting the more liquid part of such mixture into the screen.

5. A screening device that comprises a sump, a casing having inlet and discharge openings, a passageway connecting the sump and the said inlet opening, a screening device in the casing, a conveyor in the casing that moves a mixture of liquids and solids past the screen and discharges the solids at the said outlet opening, a reversely-acting impeller adjacent to the inlet opening and of less propulsive force than the said conveyor and which is driven in a direction to retard flow of floating solids through the casing, with sufficient force to effect accumulation of floating solids in the sump, a scoop of loose spiral form with its periphery extending to a plane below the liquid level in the sump, a tubular shaft in the scoop for rotating the same, the shaft having an inlet opening in its side in position to receive sewage from the innermost spiral turn of the scoop and open at one end for discharge of the sewage a smaller second shaft within the tubular shaft, and coaxial therewith, and a scraper bar loosely hung from the second shaft in position to scrape the inner annular surface of the tubular shaft and prevent accumulation of sludge thereon.

6. A structure as recited in claim 5, wherein, a conveyor is positioned to receive sewage from the open end of the tubular shaft and is driven by the smaller shaft.

No references cited.